No. 654,149. Patented July 24, 1900.
O. GUTHRIE.
PROCESS OF FACILITATING FORMATION OF ICE.
(Application filed Dec. 28, 1899.)
(No Model.) 2 Sheets—Sheet 2.
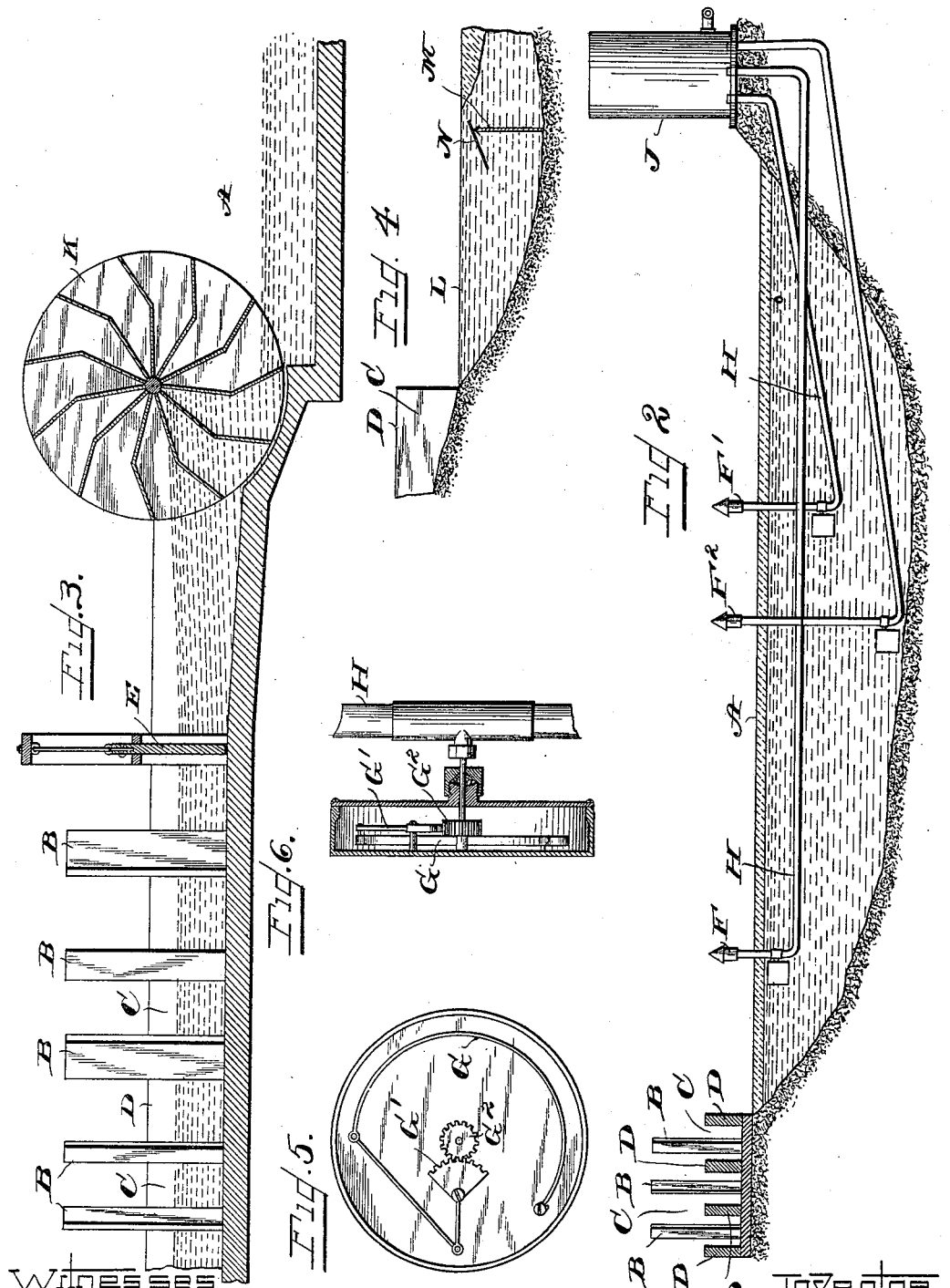

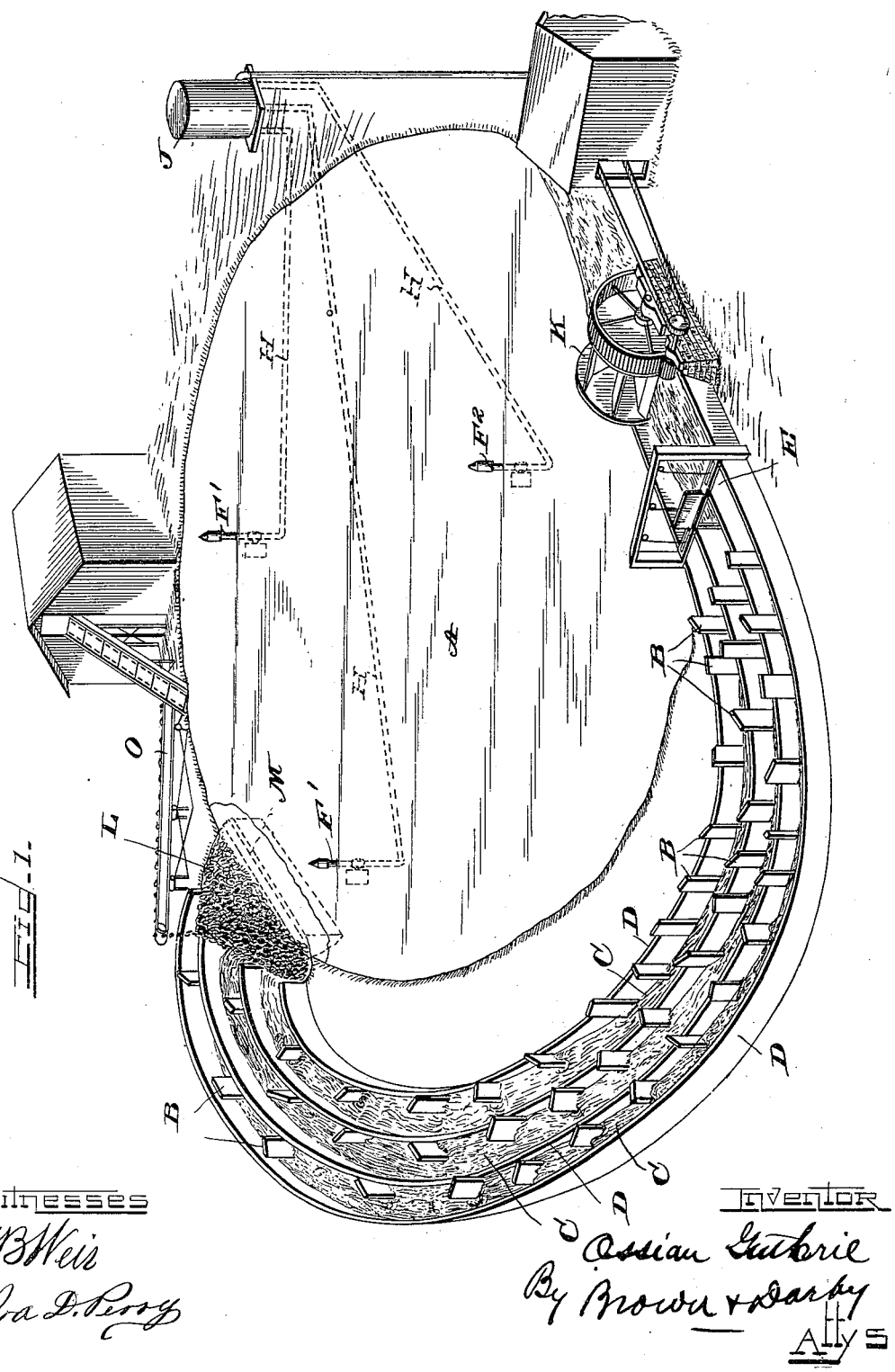

UNITED STATES PATENT OFFICE.

OSSIAN GUTHRIE, OF CHICAGO, ILLINOIS.

PROCESS OF FACILITATING FORMATION OF ICE.

SPECIFICATION forming part of Letters Patent No. 654,149, dated July 24, 1900.

Application filed December 23, 1899. Serial No. 741,490. (No specimens.)

*To all whom it may concern:*

Be it known that I, OSSIAN GUTHRIE, a citizen of the United States, residing at Chicago, in the county of Cook and State of Illinois, have invented a new and useful Process of Facilitating the Formation of Ice, of which the following is a specification.

This invention relates to a process of facilitating the formation of ice.

The object of the invention is to facilitate the formation of ice in natural bodies of water, artificial lakes, ponds, or the like.

The invention consists, substantially, in the mode of procedure hereinafter set forth, as shown in the accompanying drawings, and finally pointed out in the claims.

Referring to the accompanying drawings, wherein is illustrated a construction and arrangement adapted to the carrying out of my invention, Figure 1 is a view illustrating a lake, pond, or other body of water and showing means for carrying out the process. Fig. 2 is a transverse section through the lake and showing the signals employed in connection with the carrying out of the invention. Fig. 3 is a broken detail view in section, illustrating means for withdrawing water from the lake or pond and delivering the same in a thin sheet to be cooled in carrying out the invention. Fig. 4 is a broken detail view of the cooling-basin at the point where the withdrawn water after its temperature is reduced is returned to the lake or pond. Figs. 5 and 6 are detail views of the signal device.

The same part is designated by the same reference-sign wherever it occurs.

I have discovered that before ice will form on a pond or lake or other body of water the temperature of the water contained in such pond, lake, or the like must be reduced to about 32° from the surface to the bottom thereof and that when ice begins to form on the surface the latent heat of congelation is liberated into the body of water beneath. The latent heat thus liberated into the body of water amounts to one-hundred and forty-two British thermal units for each pound of ice formed and causes the temperature of the water beneath the forming ice to be raised to about 39°, thus introducing or liberating into the body of water an element which interferes with and greatly retards the formation of ice, and this retarding influence increases as the amount of ice increases by reason of the increased amount of latent heat thus liberated. In my prior patent, No. 277,024, dated May 8, 1883, I have set forth an arrangement and operation wherein the natural supply of water to a lake or pond is cooled to a temperature below that of the water in the lake or pond before being delivered into the lake or pond. This, however, I have found insufficient to overcome the effects of the latent heat liberated into the lake or pond by the formation of ice, and, moreover, this arrangement is dependent upon a natural source of supply, and in extremely-cold weather this supply freezes up or in very dry weather it gives out, and hence the further formation of ice on the lake or pond is retarded by the latent heat liberated into the water and which is not cared for. All these objections I overcome in the present instance by withdrawing water from the lake or pond during the formation of ice and the temperature of which is raised by the liberation of latent heat therein, and I cool this withdrawn water or reduce the temperature thereof and return the cooled water to the lake or pond, thus removing from the lake or pond the element which retards the formation of ice and returning the water to the lake at a temperature which enables the same to immediately pass into ice. I have found the best results are attained when the cooled water is returned or delivered back into the lake or pond in a thin sheet and in a manner to spread out over or skim the surface of the water in the lake or pond and in immediate proximity to the under surface of the ice, thereby increasing the rapidity of ice formation and rapidly attaining a thickness of ice on the pond or lake of from ten to twelve or more inches in thickness, as is required for marketable purposes. I have also found that the quantity of water withdrawn from the lake or pond and which is cooled and returned should be proportioned to the rapidity of ice formation—that is, if the ice is forming rapidly on the pond a greater amount of latent heat is liberated into the lake or pond than if ice is forming slowly, and hence a larger quantity of the heated water should be withdrawn to be cooled and returned. I have found in the practical operation of my process several harvests of ice may be secured from the same pond or lake each season when usually only one has been secured heretofore. I have also found that ice of a marketable thickness may be formed on the lake or pond in comparatively-mild weather where heretofore it has been impossible to attain a sufficient thickness of ice to meet the market requirements. These I consider most important and remarkable results attainable by my process and which have never before been accomplished.

In the accompanying drawings I have shown an arrangement adapted for use in carrying out the principles of my invention; but I do not claim such arrangement herein, as the same forms the subject-matter of my pending application, Serial No. 719,409, filed June 5, 1899.

In carrying out my invention a portion of the water from the lake or pond (indicated at A) is withdrawn therefrom and delivered into a suitably-arranged platform or plateau or other suitable cooling-place formed adjacent to the lake or pond, where it may spread out into a thin sheet and from which it may be returned to the lake or pond at a lower temperature than at which it was withdrawn. A series of upright slabs or posts B may be arranged in the plateau at various points, and preferably in irregular order, whereby the water is more or less stirred in flowing past them, thus subjecting every particle of the water to the cooling effect exerted thereon. The slabs or posts, which may extend above the surface of the water, may also aid to some extent in dissipating or extracting the heat from the water. If desired, and preferably, the surface of the plateau may be preliminarily frozen in order that the water delivered thereto from the lake or pond in a thin stream or sheet may be thoroughly and quickly cooled. This may be effected by permitting such surface to freeze through natural agencies before the water drawn from the lake or pond is delivered thereon, or, and preferably, I may withdraw from the lake or pond a sufficient amount of water in the initial stages of ice formation to cover the surface of the plateau or platform, and by letting this water stand exposed to a low atmospheric temperature it will freeze, thus presenting a frozen surface over which the water withdrawn subsequently from the lake or pond is spread out in a thin sheet, thereby cooling the water from below, as well as from its surface, through exposure to the atmospheric cold, and hence enabling the temperature of such water to be quickly reduced before it is returned to the lake or pond.

I have shown a convenient arrangement for delivering the water to the plateau from the lake or pond, wherein one or more sluiceways or raceways C are formed, through which the withdrawn water is passed and again returned to the lake. These sluices or raceways may be formed by means of partition-walls D, placed on edge in parallel relation. These sluices or raceways may be arranged to deliver from the lake or pond to the plateau and from the plateau back into the lake or pond, or, if desired, may be made continuous from end to end, receiving the water as withdrawn from the lake or pond at one end and returning it to the lake or pond at the other end. I have shown a plurality of sluices or raceways each controlled at its receiving end by a suitable gate E. By manipulating these gates any one or more of the sluices or raceways may be closed, thus varying the amount or quantity of water withdrawn according to the rapidity of the formation of the ice in the lake or pond. In order that it may be known what the condition of the temperature of the water in the lake or pond is and just how rapidly the heated water should be withdrawn, I may arrange suitable signals (indicated at F F' F$^2$) at suitable points in the lake or pond and at varying depths below the surface of the water and adapted to operate according to the temperature of the water. Thus signal F may be arranged to operate when the temperature of the water at a depth of, for instance, one foot below the surface falls to a certain point. The signal F' may be arranged to sound when the temperature at a depth of, say, two feet or more below the surface falls to a certain point, and so on. Of course any number of signals may be employed, and they may be of any desired construction and arranged for accomplishing the desired object. A convenient and efficient construction is shown in the form of a thermostat comprising a coil or ribbon G, composed of two or more different metals possessing different coefficients of expansion and connected at the free end thereof to a segment-rack G', arranged to engage a pinion G$^2$, the shaft of which is connected in a valve in a pipe H, through which compressed air or other suitable medium is delivered to a signal device— such, for instance, as a whistle from a storage-tank J.

The water may be delivered from the lake or pond in any suitable manner—as, for instance, a paddle-wheel K—and according to the condition of the temperature in the lake or pond, as indicated by the signals, the amount of water withdrawn from the lake or pond and delivered upon the plateau to be cooled may be regulated by manipulating the gates E or by varying the speed at which the water is withdrawn.

In carrying out my process in the most efficient manner to facilitate in the greatest degree the formation of ice, the water, after circulating over the plateau or through the sluices or gateways, and its temperature reduced, should be returned to the lake gently and smoothly and in a thin sheet or layer, which will spread over the surface of the water under and adjacent to the forming ice. This result may be effected by providing a basin L at a convenient point with reference to the lake or pond and into which the cooled water is delivered in its return to the lake or pond from the plateau. This basin may be separated from the main body of the lake or pond by means of dam M or otherwise, over the top edge of which the water may flow from the basin into the lake in a thin sheet, thus floating smoothly over the surface of the water in the lake and without undue agitation thereof. If desired, a floating apron N may be arranged in said basin to rest at one end upon the dam M. This apron, over which the water flows in passing from the basin to the lake, serves to spread such water out into a thin sheet.

In order to insure a proper reduction in the temperature of the withdrawn water before it is returned to the lake or pond, the basin L may be filled with ice, and for this purpose pieces or blocks of ice may be taken from the lake at remote parts, where it is difficult or otherwise undesirable to harvest it for storage or use in any other manner, and may be thrown into the basin or the pieces or spalls which collect at the ice-house and which are small in size to be stored may also be employed for this purpose. In Fig. 1 is shown a carrier O, arranged to extend from the ice-house, where refuse ice, broken pieces, and spalls collect in the storing operation, to the basin for conveying such pieces to the basin.

In the manner above described it will be seen that every precaution is taken and every advantage utilized in reducing the temperature of the water withdrawn from the pond to a point below that of the water in the pond and that such water with its temperature reduced is returned to the pond, thus greatly facilitating the formation of ice. It will also be seen that by reason of the fact that the temperature of the water withdrawn from the pond has been raised above the freezing-point by latent heat liberated therein by the forming ice on the pond my process may be carried on in extremely-cold weather without danger of freezing up. The ice forms rapidly, and hence repeated harvests of ice may be taken from the lake or pond each season. The operation is carried on independently of any source of supply, and hence the danger is avoided of having the formation of ice arrested by the freezing up of the supply in extremely-cold weather or by its giving out or drying up in extremely-dry weather.

It is obvious that my process may be carried out in many other ways and by means of many other specific constructions and arrangements, that shown being merely illustrative of an operative means.

Having now set forth the object and nature of my invention and the mode of operation thereof, what I claim as new and useful, and desire to secure by Letters Patent, is—

1. The method of facilitating and accelerating the formation of ice which consists in withdrawing a portion of the water from the body of the water in which the ice is being formed, and into which has been liberated the latent heat of the water which has previously passed into ice, then reducing the temperature of such withdrawn water, and finally returning the same at a reduced temperature to the main body of water as and for the purpose set forth.

2. The method of facilitating and accelerating the formation of ice in ponds or lakes which consists of withdrawing a portion of the water from the pond or lake during the formation of ice, then spreading out such withdrawn water in a thin sheet or layer, and subjecting the same to cooling agencies whereby its temperature is reduced and finally returning such withdrawn water at the reduced temperature to the pond or lake as and for the purpose set forth.

3. The method of facilitating and accelerating the formation of ice in ponds or lakes, which consists in withdrawing a portion of the water from such pond or lake during the formation of ice, then reducing the temperature thereof and finally returning the same at a reduced temperature to the pond or lake in a thin sheet over the surface thereof as and for the purpose set forth.

In witness whereof I have hereunto set my hand, this 14th day of December, 1899, in the presence of the subscribing witnesses.

OSSIAN GUTHRIE.

Witnesses:
E. C. SEMPLE,
S. E. DARBY.